(12) United States Patent
Rao et al.

(10) Patent No.: US 6,495,175 B2
(45) Date of Patent: Dec. 17, 2002

(54) PROCESS FOR OBTAINING USEFUL MATERIALS FROM FENUGREEK SEEDS

(76) Inventors: Garrimella B. Rao, 43/52 Dr. Jagannatha Nagar, Aerodrome Post, Coimbatore 641 014 Tamil Nadu (IN); Angappa M. Ponraj, Kalyani Chemical Campus, Mettur Main Rd., Near Bus Stand, Bhavani 638 102, Tamil Nadu (IN); Thavitturpalayan K. Rajendran, 636 Netaji Rd., Sri Krishna Building, Erode 638 001, Tamil Nadu (IN)

( * ) Notice: Subject to any disclaimer, the term of this patent is extended or adjusted under 35 U.S.C. 154(b) by 0 days.

(21) Appl. No.: 09/780,947

(22) Filed: Feb. 9, 2001

(65) Prior Publication Data

US 2001/0024665 A1 Sep. 27, 2001

(30) Foreign Application Priority Data

Feb. 14, 2000 (IN) .................................. 112/00

(51) Int. Cl.$^7$ .............................................. A61K 35/78
(52) U.S. Cl. ........................ 424/757; 424/776; 424/725
(58) Field of Search ................................ 424/725, 757, 424/776

(56) References Cited

U.S. PATENT DOCUMENTS

| | | |
|---|---|---|
| 5,658,571 A | 8/1997 | Gopalan et al. |
| 5,997,877 A | 12/1999 | Chang |
| 6,013,289 A | 1/2000 | Blank et al. |
| 6,013,304 A | 1/2000 | Todd |

OTHER PUBLICATIONS

Shankaracharya, N. B. and Natarajan, C. P., Fenugreek Chemical Composition and Uses, Central Food Technological Research Institute, 1972, 2–12.

Shankaracharya, N. B. et al., Oils and Oleoresins from Major Spices, Journal of Plantation Crops, Jun. 1982, vol. 10 (1): 1–20.

Fenugreek, Fenaroll's Handbook of Flavor Ingredients, 1998, 124–125, 1095.

Neeraja, A. et al., Hypoglycemic Effect of Processed Fenugreek Seeds in Humans, J. Food Sci. Technol., 1996, vol. 33, No. 5, 427–430.

Sharma, R.D., An Evaluation of Hypocholesterolemic Factor of Fenugreek Seeds (*T. Foenum Graecum*) in Rats, Nutrition Reports International, Apr. 1986, vol. 33 (4), 670–675.

Sharma, et al., Hypoglycemic Effect of Fenugreek Seeds in Non–Insulin Dependent Diabetic Subjects, Nutrition Research, 1990, vol. 10, 731–739.

Anderson, et al., Nutritional Management of Diabetes Mellitus, Diet and Nutrition in Disease, Chapter 70, pp. 1259–1286.

*Primary Examiner*—Christopher R. Tate
(74) *Attorney, Agent, or Firm*—Rick Matos; Innovar, L.L.C.

(57) ABSTRACT

A method for obtaining substantially pure fixed oil(s), oleoresin and dietary fiber from Fenugreek seeds is provided. The method employs two different solvent extraction stages, wherein the first extraction isolates fixed oils and the second extraction isolates oleoresin. The dietary fiber remaining after extraction is clean, approximately light yellow to light brown, substantially tasteless and substantially odorless. An extraction system (23) for conducting the extractions is also provided. The extraction system (23) includes a condenser (24), a seed holding extraction vessel (25), a reboiler ((26), solvent and extract reservoir) and a feedback loop (28). The extraction solvent is obtained from the reboiler and it is contacted with the Fenugreek seeds while hot shortly after condensation in the condenser. The extraction system employs minimal amounts of solvent compared to conventional processes. In terms of color, taste, and/or odor, the food grade isolated fixed oils, oleoresin and dietary fiber are superior to those products obtained from conventional extraction processes.

22 Claims, 2 Drawing Sheets

PROCESS FOR OBTAINING USEFUL MATERIALS FROM FENUGREEK SEEDS

FIELD OF THE INVENTION

This invention relates generally to a process for extraction of seeds and specifically to a process for the preparation of useful materials such as dietary fiber, oleoresin and fixed oils from the seeds of Fenugreek (Trigonella Foenum Graecum L). This invention also relates to an extraction apparatus for extraction of the seeds.

BACKGROUND OF THE INVENTION

Fenugreek is an herbaceous plant of the leguminous family and is native to Western Asia, from where it has spread widely over Europe, the Mediterranean and rest of Asia. It is one of the oldest cultivated plants and through the ages has found wide application as a food, a food additive and in the traditional medicine of every region in which it has been cultivated. For example, one of its earliest uses was in Egypt where it was used as a flavoring agent in bread and other foods and as an anti-pyretic. Similarly, in India and elsewhere, the leaves, and both the ripe and unripe seeds of Fenugreek are used as vegetables and the ripe seed further, has numerous applications in the traditional medicine system of India. The seeds also function as a preservative and are added to pickles, chutneys and other similar products. In modem food practice, the seeds or the extract are used in bakery products, frozen dairy products, meat products, relish, condiments, candy, gravy sauces, gelatin puddings and in alcoholic and non-alcoholic beverages. The leaves of Fenugreek are also used in forage for cattle and the seeds as an additive in cattle feeds. Because of its significant nutrition potential, the seeds and products made therefrom are also used as food supplements.

Fenugreek has been used in treating colic flatulence, dysentery, diarrhea, dyspepsia with loss of appetite, chronic cough, dropsy, enlargement of liver and spleen, rickets, gout and diabetes. The seed is stated to be a tonic. It is also used in post-natal cure and to increase lactation in nursing mothers. Its lactation inducing property is also used with milch cattle to increase the yield of milk. The seed was used as a cure for baldness in the middle ages and today it is used as part of hair tonics in some countries. The seed also has several applications in veterinary medicine.

Modem medicine is beginning to provide confirmation of many of the traditional medicinal applications of Fenugreek. For example, it has been established that the saponins of Fenugreek and also the galactomannans contained in the mucilage of fenugreek have a beneficial effect on glucose, insulin and cholesterol metabolism.

Thus, these components along with the dietary fiber contained in fenugreek have an important role in the treatment and management of several disorders such as obesity, coronary heart disease, diabetes, piles, fissures, chronic constipation & diverticulitis. Similarly, the fixed oils of fenugreek are reported to contain the principle that causes increased lactation. The saponins mentioned above are also reported to contain active components that are anti-carcinogenic, anti-microbial and/or anti-oxidant. The saponins further contain a compound, a sapogenin called diosgenin—estrogen, that is the precursor in the manufacture of sexual hormones and oral contraceptives.

Fenugreek seed contains a large number of individual compounds such as volatile oil, fixed oils, proteins, carbohydrates, resins, pigments, vitamins, minerals and others. Typical analyses of fenugreek seed are shown in the tables below.

| INGREDIENT | AMOUNT % |
| --- | --- |
| MOISTURE | 5.77 to 10.30 |
| ASH | 3.15 to 4.8 |
| FAT | 7.61 |
| REDUCING SUGARS | 2.14 |
| NON-REDUCING SUGARS | 1.54 |
| PENTOSES | 6.07 |
| METHYL PENTOSES | 3.42 |
| TOTAL NITROGEN | 4.28 |
| SOLUBLE NITROGEN | 1.56 |
| NITROGEN SOLUBLE IN ALCOHOL | 0.048 |
| TOTAL PROTEIN | 16.97 |
| ALCOHOL SOLUBLE PROTEIN | 0.30 |
| TOTAL AQUEOUS EXTRACT [COLD] | 20.52 |
| TOTAL ORGANIC EXTRACT [COLD] | 18.81 |
| TOTAL AQUEOUS EXTRACT [HOT] | 15.89 |
| TOTAL ORGANIC EXTRACT [HOT] | 15.25 |
| TOTAL ALCOHOL EXTRACT | 2.28 |
| HEMICELLULOSE | 11.98 |
| CELLULOSE | 6.40 |
| GUMS | 23.05 |
| MUCILAGE | 28.00 |
| TRIGONELLINE ($C_7H_7O_2N$) | 0.1274 to 0.38 |
| FIBER | 15 to 20 |
| ETHER EXTRACT | 6.58 |
| NON - NITROGENOUS EXTRACT | 46.70 |
| TOTAL SAPONIN | 1.7 |

(Data taken from LUPEZ, RC; OLMEDO, RG; AND PERULTA T; ANULES BREMATOL., 2,353-60 (1950); CA 45:9140 b(1951))

| | CONSTITUENT | PERCENTAGE |
| --- | --- | --- |
| 1. | MOISTURE | 9.0 |
| 2. | ASH | 3.2 |
| 3. | LIPIDS | 7.0 |
| 4. | PROTEIN (N X 6.25) | 26.0 |
| 5. | STARCH | 1.6 |
| 6. | FIBER | 48.0 |
| | Mucilage | 20.0 |
| | Hemicellulose | 17.3 |
| | Cellulose | 8.2 |
| | Lignin | 2.5 |
| 7. | SAPONIN | 4.8 |
| 8. | TRIGONELLINE | 0.37 |

(Data taken from THE WEALTH IF INDIA, CSIR GOVT. OF INDIA PUBLICATION.)

The essential oil is conventionally obtained by steam distillation of the dried seed. Steam distillation does not extract the taste factors of Fenugreek as these are fairly non-volatile resinous compounds. Thus, when incorporated in foods, the essential oil isolated by prior art methods merely provides the odor of fenugreek and not the pungent taste of Fenugreek.

The oleoresin has been obtained by extraction with an organic solvent. However, in the conventional processes, traces of the solvent remain and tend to interfere with the aroma and taste of the oleoresin. Further, conventional processes employ solvents such as chlorinated solvents, e.g, ethylene dichloride and methylene dichloride, which are toxic and pose health threats. Chlorinated solvents potentially undergo decomposition when heated to form hydrogen chloride and carbonyl chloride, which by-products are toxic. Food regulations of most countries, however, dictate that these even trace amounts of these toxic solvents be removed. Removal of the solvent traces is extremely difficult. Removal is often effected by evaporation of the solvent traces under heat and/or vacuum. However, this invariably results in a degree of damage to the heat labile flavor components and the consequent change of the oleoresins' flavor. Other methods of removing the solvent have been developed; however, all those methods are costly, cumbersome and not always fully successfiil. The conventional production of oleoresin that is substantially true to the aroma and taste of the seed is an extremely difficult operation requiring skill and care at each stage of processing. Moreover, conventional processes are extremely unreliable due to significant variability in the quality of the isolated oleoresin.

The bitterness present in conventional extracts of Fenugreek typically comes from the hydrolytic breakdown of lipids present in the fixed oil fraction. This problem exists predominantly in conventional processes that employ steam or water extraction of components from Fenugreek seeds. The hydrolysis of lipids, which occurs over a period of time leads to rancidity and imparts a dark brown to black color to the seed. Therefore, the bitterness and darkened coloration is passed on to the residual dietary fiber of fenugreek even after the extraction. A dietary fiber product having such bitterness and coloration is not acceptable as a food product, supplement or additive.

Because of its inertness, the importance of dietary fiber was not realized until the link between fiber deficiency and several disorders and diseases was conclusively established. Modern diets, particularly the urban ones, include a large amount of processed foods that are carbohydrate rich and fiber deficient. Fiber deficiency is now known to be the causative factor of several disorders, such as heart ailments and coronary artery disease, diabetes, constipation, colon cancer, piles, fissures, gallstones and others. A diet having adequate amount of dietary fiber is now known to be important not only from the point of view of preventing the disorders but also in the cure and management thereof. Public health and Nutrition bodies now prescribe a minimum daily dietary fiber intake and the recommended figures range between 30 to 40 gm per day per person. For individuals having fiber related disorders, dietary fiber offers either a cure or help in the management thereof. It has been reported that high sugar and fat rich foods, i.e., fiber depleted foods, form 55 to 60% of the daily calorie intake in many countries as compared to 15–20% a century ago.

Insoluble dietary fiber mainly comprises cellulose, lignins and some hemicelluloses; while, soluble dietary fiber mainly comprises pectin, gums and some hemicelluloses. The two types play somewhat different roles in the intestinal tract. The former enhances the food bulk and generates a feeling of satiety although the feeling is not as strongly perceived as in the case of the latter. Increased satiety leads to lower food intake. Insoluble fiber also causes increase in faecal bulk by virtue of its indigestible nature and because of fermentation thereof, in the intestine. The insoluble fiber causes quicker movement of the food mass along the intestinal tract. Soluble fiber on the other hand, tends to enhance the viscosity of the food mass in the intestinal tract and slows down the transit down the tract thereof. The feeling of satiety is also observed with diets incorporating soluble fibers and as mentioned the feeling is stronger than for insoluble fibers. The food intake therefore, tends to go down also with soluble fibers. Soluble fiber also undergoes fermentation in the gut producing some volatile fatty acids which are important from the point of view of nutrition. These fatty acids are absorbed by the intestine.

Soluble fiber of Fenugreek, guar gum, oat bran, oat gum, oat hulls, bengal gram and pectin have a strong cholesterol lowering effect. Similar lowering has also been observed in the case of serum triglycerides/triacylglycerols. HDL & LDL cholesterol are also favorably affected and an improvement of the HDL/LDL ratio is observed with soluble fiber. The beneficial effect also extends to liver cholesterol and triglycerides.

The groups of above compounds that are of significance commercially (and industrially) include essential oil, fixed oils, oleoresin and dietary fiber. These are generally obtained by fractionation of Fenugreek using one or more processes such as steam distillation, hydro-extraction, solvent extraction, hydrolysis and others. These conventional processes, however, generally do not provide acceptable products or are limited to providing only one useful product obtained from Fenugreek.

One extraction process requires that the solid material be charged into a vessel (tank) and fresh extraction solvent added thereto. Enough solvent is added, i.e., generally up to a level of few centimeters above the solids level, to ensure complete submergence of the solid material. Such an extraction system is referred to herein as a static system and the solid material being extracted as a "bed of solids" or "solid bed". Where extraction is required to be conducted at a temperature above ambient, the vessel is optionally provided with a jacket for circulation of a heating medium such as steam, hot water or others. At the end of extraction, the extract and the extracted solids are removed from the vessel. The extraction solvent is drained from the vessel either intermittently or continuously by way of a false bottom comprising a perforated plate and/or a filtration medium. The chief drawback of a conventional static system that employs the addition of unheated fresh solvent is the difficulty of maintaining a uniform temperature in the bed particularly when heat is added, by heating coils, into the vessel contents. The temperature is found to be neither uniform throughout the bed nor over the period of extraction. Such nonuniformities in temperature and solvent concentration render the extraction process somewhat non-reproducible in that small but subtle differences in the composition and quality of the extract are observed from batch to batch. For example, in conventional static extraction process, the moisture content present in the seed passes into the extraction solvent at the commencement of the extraction. Thus, during the rest of the extraction, the solvent in contact with the seeds is somewhat diluted by that moisture resulting in a lower driving force for extraction.

When fresh, i.e., solute-free, solvent is contacted with solids to be extracted the driving force for extraction (for dissolution of solute in solvent) is high. However, the driving force continually diminishes as extraction proceeds. Actually, a point is reached where the rate of extraction is so diminished that further extraction is uneconomical. Generally, the extract is then drained out and a new batch of solvent added to the bed to continue the extraction. The new batch of solvent may be either fresh (solute free) solvent or a dilute extract from another extraction batch, e.g., countercurrent extraction method. In another embodiment of the static system the solvent containing extracted solute is continuously circulated to improve contact of the solvent and solids; however, this reduces extraction efficiency due to the extraction solvent already containing solute.

Conventional static systems have the same drawback of nonuniformities. In a static system with the continuous solvent re-circulation, channeling of the solvent in the bed also causes the nonuniformities. A further disadvantage is that a continuous circulation system requires a larger amount of solvent, which adds to the costs of solvent recovery by evaporation or other means. Also, a solvent re-circulation system that recycles used solvent requires additional capital equipment in the form of additional solvent pumps, tanks and other items. Another drawback of conventional static systems is that the contact between the solvent and solid is not efficient. Thus even if the driving force is high, for example as at commencement of extraction, the actual rate of solute dissolution remains low.

One approach to the problem of low dissolution rates in the prior art is to employ a stirred/agitated tank reactor in which the solvent and solid are contacted. Such a system is referred to herein as a dynamic system. A dynamic system can be adapted to the continuous or intermittent solvent re-circulation and also to the counter current arrangement. A dynamic system undoubtedly provides better solvent—solid contact but has the drawback of a greater capital investment. Also, it requires a larger amount of solvent leading to increased capital costs and increased operating costs in solvent evaporation or removal and recovery.

Processes for the extraction of Fenugreek are disclosed in U.S. Pat. No. 5,658,571 to Gopalan et al., U.S. Pat. No. 5,997,877 to Chang, U.S. Pat. No. 6,013,289 to Blank et al., and U.S. Pat. No. 6,013,304 to Todd. However, none of these references disclose the presently claimed extraction process and associated process equipment.

The process of Gopalan et al. is a static type process and consequently suffers from the drawback of the nonuniformities discussed above. Gopalan et al. disclose the use of a single solvent that apparently extracts a mixture of fenugreek fractions. Gopalan et al. do not disclose recovery of the individual Fenugreek fractions by selective sequential solvent extraction with different solvents. Gopalan et al. also disclose that the extraction solvent is heated after the Fenugreek seed is immersed in the solvent. Moreover, most of the solvents used by Gopalan et al., with the exception of ethanol and isopropanol, are either chlorinated or toxic or both, and therefore somewhat unsuitable for applications involving food grade products. Gopalan et al. also disclose multiple extractions, each with a separate batch of fresh solvent or each with solvent containing extracted solutes. In neither embodiment do Gopalan et al. add a heated solvent to the Fenugreek seeds. In addition, Gopalan et al. do not disclose repeatedly contacting the Fenugreek seeds with freshly distilled hot recirculated solvent obtained from a reservoir containing the extraction solvent comprising solute.

The process of Chang is a dynamic type process, which also suffers from the associated disadvantage/drawbacks outlined above. The Chang process produces oleoresin wherein the fixed oils therein have not been removed. Therefore, the oleoresin product is susceptible to bitterization and discoloration caused by rancidity in the fixed oils. The Chang process introduces water into the system by tempering the seeds prior to extraction and by the use of 95% ethanol in the extraction process even before the removal of the bulk of fixed oils therein.

Accordingly, the known processes for extracting components from Fenugreek provide unacceptable products in terms of excessive colorization, bitterness, and rancidity. None of the known art discloses a process for separating fixed oil and then oleoresin from Fenugreek seeds to obtain a dietary fiber rich meal.

SUMMARY OF THE INVENTION

The present invention addresses the problems and drawbacks associated with conventional processes for obtaining useful products from Fenugreek seeds. In particular, low boiling non-toxic solvents have been selected where the removal of trace amounts of solvent from the useful products is comparatively easy. One of the highlights of the process of the invention is that the process of extraction of oleoresin, although highly simple and economical, reproducibly provides a high purity food grade product oleoresin by minimizing contact temperature nonuniformities inherent in conventional processes. By continuously providing freshly distilled recycled hot solvent, the present process is cost effective, provides maximum extraction efficiency, and balances the contact ratio and contact time to provide an overall economical process in terms of operating and capital costs. Contact of seeds with water during extraction is eliminated by avoiding contact of the seeds with water at least until the bulk of the fixed oils have been extracted out of the seeds by the first extraction solvent. The process of the invention can be used to provide a dietary fiber having a fat content of less than about 0.5% or less than about 0.3%.

The process of the invention employs a 2-stage extraction process in which two separate solvents are used, the pair of solvents being selected such that the first solvent extracts the fixed oils exclusively, or almost exclusively, and the second solvent extracts the oleoresin and optionally other components present in the Fenugreek seeds. The second solvent extracts out substantially all of the remaining fixed oils in the seed, thereby reducing the lipid content remaining in the residual dietary fiber generally to below 0.5%, below 0.3%, or below 0.1%.

A key feature of the present invention is that the fixed oils of the seed are isolated and removed as a first step so as to ensure a dietary fiber having little to no bitterness or discoloration. The second fraction obtained by solvent extraction of the seed from which the fixed oils have been removed is quite faithful to the aroma and taste of fenugreek. The second fraction therefore referred to herein and in the art as the oleoresin, despite the fixed oils having been separated therefrom. By removing a major portion of the fixed oils from the seeds with the first extraction solvent, the present process eliminates or reduces the occurrence of bitterness and excessive coloration of products obtained by subsequent processing of the seeds.

This invention provides a process for the isolation of essential oil, oleoresin, fixed oil, proteins, vitamins minerals, saponins, and/or sapogenins from Fenugreek seeds. These products are obtained by fractional separation of some of these fractions of Fenugreek seed. The invention provides a process for the production of substantially pure food grade dietary fiber, oleoresin and fixed oils from Fenugreek seeds.

The process of the invention comprises the following general features: 1) a two-stage process employing two different solvents having solubility characterisitics such that the first solvent selectively extracts out the bulk of its fixed oil fraction of the seeds during the first stage and the second solvent is effective in extracting out substantially all of the oleoresin fraction and substantially all of the small amount of fixed oils remaining in the first extracted mass; 2) contact of solids with freshly condensed solvent in both stages such that the bed is substantially continuously charged with the freshly condensed solute-free solvent thereby maximizing extraction efficiency; 3) draining of the solvent in contact with the bed of seeds each time the bed is completely submerged by the solvent such that the bed is substantially continuously in contact with freshly condensed solute free solvent and the extraction rate is maximized throughout the extraction, the contact being substantially at the highest feasible temperature, which is generally the condensing temperature of the solvent; 4) addition of hot freshly condensed solvent to the bed of seeds such that the process conserves heat, is simplified and requires very simplified extractor equipment; 5) evaporation of the extraction solvent from the first extract yields a substantially pure fixed oil fraction generally requiring no further separation and purification; 6) evaporation of the extraction solvents from the extracted fractions is not an added cost as the process is based on continuous evaporation and condensation of solvents; 7) the pair of extraction solvents employed in the process are low-boiling, non-toxic and non-hazardous from health point of view and traces thereof are easy to remove/recover; and 8) the extraction of the major portion (generally at least about 85%) of the fixed oils fraction during the first extraction stage thereby allowing the use of even aqueous alcohol solvents during the second extraction stage while minimizing the risk of bitterisation and discoloration (excessive coloration), the advantage of use of the aqueous alcohol solvents during the second extraction stage being that it rapidly and effectively extracts out the oleoresin and the remainder of fixed oils from the seeds; 9) a simple, novel, cost-effective procedure for separation of the oleoresin and fixed oils from the second extract; and 10) potential for the use of solvent mixtures.

According to one aspect of the invention there is provided a process for the extraction of Fenugreek (Trigonella Foenum Graecum L.) seeds to produce substantially pure dietary fiber, oleoresin and fixed oils comprising the steps of:
1) optionally, sorting and cleaning Fenugreek seeds and crushing, grinding, flaking and/or milling thereof;
2) extracting the seeds with a hot substantially freshly condensed first solvent (or mixture of solvents) in a first stage of extraction to yield a first extract and partly extracted seeds;
3) extracting the partly extracted seeds with a hot substantially freshly condensed second solvent (or mixture of solvents) in a second stage of extraction to yield a second extract and a wet dietary fiber; and
4) drying of the wet dietary fiber to form a substantially pure dietary fiber.

The process of the invention can also include one or more of the following steps:
heating the first extract to evaporate the first solvent therefrom to yield substantially pure fixed oils;
heating the second extract to evaporate the second solvent therefrom to yield a product mixture of oleoresin and fixed oils;
treating the product mixture with ethanol for a period of time and at a controlled temperature to form a treated mixture;
cooling the treated mixture to yield a liquid comprising a heavy phase and a light phase;
separating the heavy and light phases, wherein the heavy phase comprises the substantially pure oleoresin;
separating, by filtering or other means, any solids or crystallized impurities, such as fats and waxes, from the light phase; and
evaporating ethanol from the light phase to yield the substantially pure fixed oils.

The invention also provides a method of obtaining valuable components from Fenugreek seeds comprising the steps of:
extracting the Fenugreek seeds with a first extraction solvent to provide a first useful extract and a first extracted mass;
extracting the first extracted mass with a different second extraction solvent to provide a second useful extract and a second extracted mass; and
removing solvent from the second extracted mass to provide a useful solid.

Specific embodiments of this aspect of the invention include those wherein: 1) the first extraction solvent is petroleum ether and the second extraction solvent is 90–5% ethanol (aq.); 2) the first useful extract comprises fixed oils and the second useful extract comprises oleoresin; 3) the first solvent is selected from the group consisting of petroleum ether, hexane, n-propanol, isopropanol, and a combination thereof; 4) the second solvent is selected from the group consisting of ethanol, isopropanol, aqueous isopropanol, aqueous ethanol and a combination thereof; 5) a major portion of the first extraction solvent is removed from the first useful extract to form substantially pure fixed oil; 6) a major portion of the second extraction solvent is removed from the second useful extract to form a mixture comprising oleoresin and optionally fixed oil; 7) the mixture of oleoresin and fixed oil is treated with an ethanolic solution to form substantially pure oleoresin and a mixture of other components including fixed oil; 8) solids are removed from the mixture of other components and fixed oil and the ethanol and water are evaporated to form substantially pure fixed oil; 9) the useful solid comprises a dietary fiber; and/or 10) the seeds are cleaned, ground, sorted, tempered, flaked, crushed and/or milled prior to extraction.

According to other aspects of the invention, there is provided a dietary fiber, fixed oil or oleoresin of fenugreek seed produced by the process of the invention optionally conducted in the extraction system of the invention.

Accordingly, the invention also provides a substantially pure fixed oil obtained from Fenugreek seeds by a process comprising the steps of:
substantially continuously contacting a freshly condensed hot first extraction solvent with a bed of Fenugreek seeds for a period of time and at a constant temperature sufficient to form an extract comprising fixed oil and the first extraction solvent, wherein the freshly condensed first extraction solvent is obtained from a reservoir containing the extract;
separating the Fenugreek seeds from the extract; and
removing at least a major portion of the extraction solvent from the extract to form the fixed oil.

Specific embodiments of the invention include those wherein: 1) the first extraction solvent is selected from the group consisting of petroleum ether, hexane, n-propanol, isopropanol, and a combination thereof; 2) the temperature of the extraction solvent approximates the boiling point or the condensation temperature of the first extraction solvent; 3) wherein the fixed oil comprises fatty acid esters such as the glycerol esters of palmitic, arachidic acid, behenic, oleic, linoleic and/or linolenic acid; 4) the ratio of the Fenugreek seeds to the first extraction solvent from about 1:1 to 1:5 weight/volume (kg/L).

The invention also provides a substantially pure oleoresin obtained from Fenugreek seeds by a process comprising the steps of:
contacting Fenugreek seeds with a first extraction solvent for a period of time and at a temperature sufficient to form a first extract comprising fixed oil and the first extraction solvent, wherein a major portion of fixed oil present in the Fenugreek seed is removed by the first extraction solvent;
separating the Fenugreek seeds from the first extract to form partially extracted seeds;
contacting the partially extracted seeds with a different second extraction solvent for a period of time and at a temperature sufficient to form extracted seeds and a second extract comprising oleoresin, fixed oil and the second extraction solvent;

separating the extracted seeds from the second extract;
removing at least a major portion of the second extraction solvent from the second extract to form a concentrate;
contacting the concentrate with an ethanolic solution to form a heterogeneous solution comprising an oleoresin-containing layer and one or more other layers; and
isolating the oleoresin-containing layer to form a substantially pure oleoresin.

Specific embodiments of this aspect of the invention include those wherein: 1) the Fenugreek seeds are contacted with the first extraction solvent continuously, semi-continuously or batchwise; 2) the first and/or second extraction solvents are percolated through the Fenugreek seeds; 3) the first and/or second extraction solvents are freshly distilled; 4) the first extraction solvent is obtained from a reservoir comprising fixed oil and the first extraction solvent; 5) the second extraction solvent is obtained from a reservoir comprising oleoresin, second extraction solvent and optionally fixed oil; and/or 6) the ethanolic solution comprises ethanol or ethanol and water.

The invention further provides a dietary fiber obtained after extraction of Fenugreek seeds by an extraction process comprising the steps of:
extracting the Fenugreek seeds with a first extraction solvent to remove fixed oil from the seeds;
extracting the partly extracted seeds with a different second extraction solvent to remove oleoresin from the seeds; and
separating the seeds from any remaining extraction solvent to form a dietary fiber.

Specific embodiments of this aspect of the invention include those wherein: 1) the solvent temperature approximates the boiling point or the condensation temperature of the respective extraction solvent; 2) the first and second solvents are hot and freshly condensed when used to extract the Fenugreek seeds; 3) at least a major portion of fixed oils are removed from the dietary fiber by extraction; 4) wherein at least a major portion of oleoresin are removed from the dietary fiber by extraction: 5) the dietary fiber has little to no taste, is light yellow to light brown, and has little to no odor; 6) the dietary fiber has a fat content of less than 0.5%, less than 0.3% or less than 0.1%; and/or 7) the dietary comprises approximately equal amounts of soluble fiber and insoluble fiber.

The invention thus provides a method or process for making substantially pure food grade dietary fiber from fenugreek seeds and to recover two other fractions thereof, namely, oleoresin and fixed oils also in substantially pure form and of food grade quality. The invention also provides substantially pure food grade dietary fiber, oleoresin and fixed oils, wherein de-bitterisation of the dietary fiber is also achieved.

According to another aspect of the invention, there is provided an extraction system for the extraction of fenugreek seeds comprising:
an extraction vessel having means for holding the bed of solid materials to be extracted;
a reboiler;
a condenser; and
conduits interconnecting the condenser and the reboiler so as to conduct vaporized solvent from the reboiler to the condenser.

The condenser effects condensation of the solvent vapors to form a freshly distilled hot solvent that is contacted with the bed at substantially the condensing temperature thereof. The system also comprises means for periodically draining the extracts from the reboiler, means for controlling heat input to the reboiler, cooling means in the condenser, and other control means as needed.

Other aspects of the invention provide finished products comprising the above-described fixed oil, oleoresin or dietary fiber. Some embodiments of this aspect include: 1) omega fatty acids derived from the fixed oils of fenugreek; 2) essential oil of fenugreek; 3) resinous taste compound(s); 4) flavoring compound(s); 5) galactomannans; 6) protein; 7) amino acids such as lysine; 8) insoluble fiber; 9) soluble fiber; 10) vitamin(s); 11) mineral(s), such as sodium, potassium, iron and phosphorous; 12) choline; and/or 13) carbohydrates. These products can be used in vitamin supplements, nutritional supplements, dietary supplements, and/or as food additives.

Thus, the invention provides a fenugreek-based dietary fiber that can be consumed as a supplement or added to other food during the process of cooking thereof. In addition, other nutrients may be added to the dietary fiber of the invention to provide a greater nutritional balance and/or to restore nutritional deficiencies. A dietary fiber product may also comprise added taste, flavor and/or coloring agents.

BRIEF DESCRIPTION OF THE FIGURES

The following drawings are part of the present specification and are included to further demonstrate certain aspects of the invention. The invention may be better understood by reference to one or more of these drawings in combination with the detailed description of the specific embodiments presented herein.

DETAILED DESCRIPTION OF THE INVENTION

Figure 1:
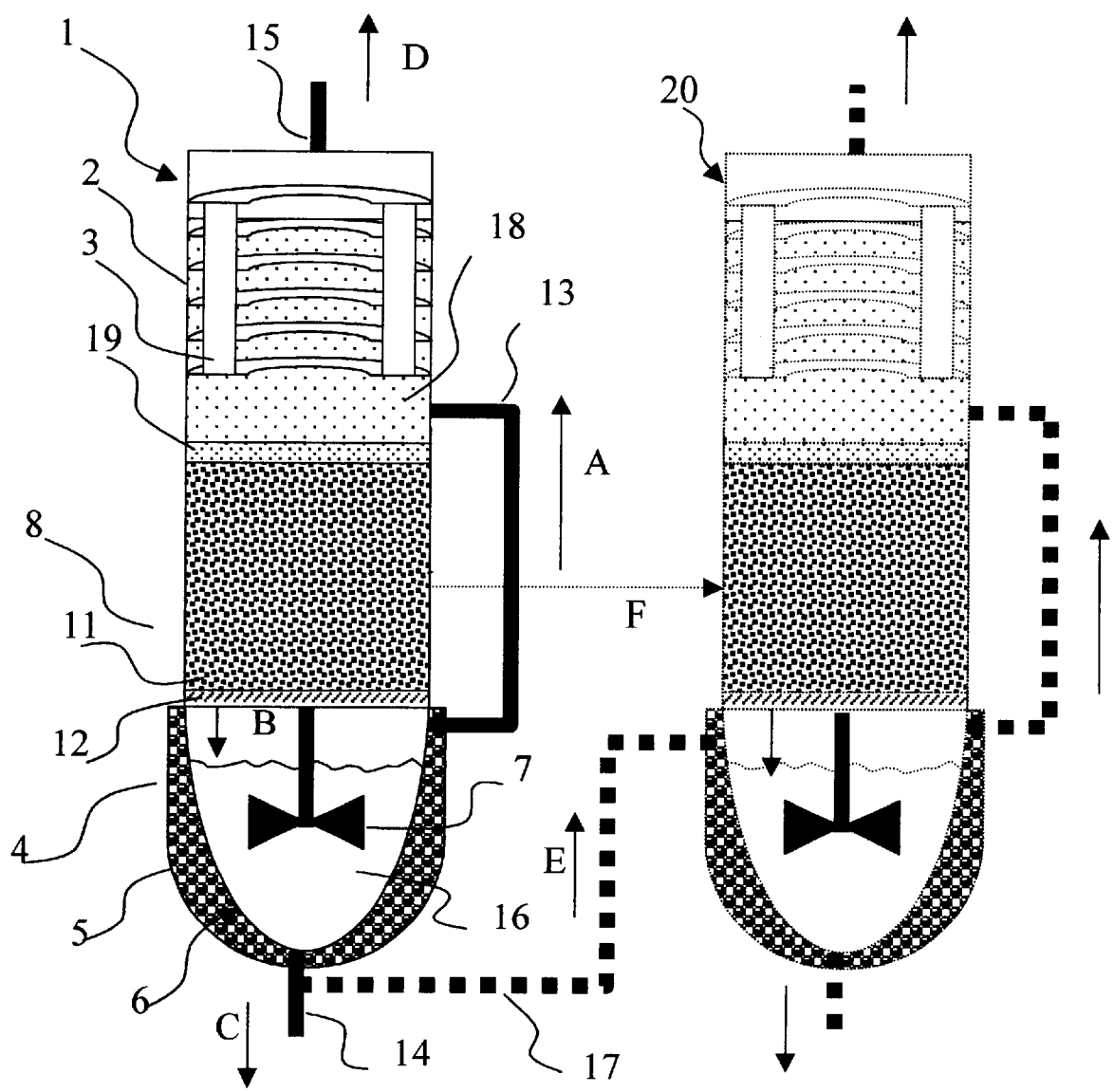
FIG. 1 is a sectional front elevation of a unitary extraction system used in conducting the process of the invention.

The invention addresses the above-mentioned problem of nonuniformity, which is found in conventional processes. Moreover, the present invention also addresses the problem of low solute dissolution rates, which results in inefficient utilization of capital equipment and higher operating costs. The process of the invention also provides a solution to the conventional problems concerning larger investment costs and operating cost relating to excessive solvent use inherent in conventional methods.

The useful products produced by the processes of the invention include oleoresin, fixed oil and dietary fiber, among others. While the meaning of the terms "oleoresin", "essential oil", and "dietary fiber" are not used consistently in the spice industry, such terms are generally defined herein as follows.

Essential Oil:

This fraction of Fenugreek is similar to the volatile oil fraction of seeds and comprises the aroma and odor forming components contained in the seed. The essential oil of Fenugreek possesses a strong odor and is greenish-yellow in color.

Oleoresin:

An oleoresin generally comprises the aroma and flavoring principles of the spice and includes the fixed oils and the resins thereof which provide the pungency and taste to the spice. The oleoresins of Fenugreek are obtained by solvent extraction. A number of solvents are available for this purpose. The actual composition of oleoresin that is extracted depends upon the solvent used. Accordingly, a certain amount of small but subtle differences in aroma, taste, and flavor may be found in oleoresins obtained using different solvents. Similar subtle differences may also be observed from one sample to another even when using the same solvent because of small variations in extraction parameters such as contact time (extraction time), extraction temperature, degree of mixing of the solid and solvent, and others. It should be noted however, that the process of the invention minimizes any such differences and provides a more uniform quality of oleoresin from batch to batch, than do conventional methods. After solvent extraction, the oleoresin is generally separated from the extraction solvent by evaporation of the solvent with or without heat. The oleoresin will generally include saponins, steroidal sapogenins (diosgenin and gitogenin obtained by hydrolysis), galactomannans, resins, glycosides, pigments, resins (taste factors), essential oils (odor factors) and other similar components.

Fixed Oils:

The lipids in Fenugreek seeds are the fixed oils thereof and comprise the following fatty acids: palmitic, stearic, arachidic, behenic, oleic, linoleic and linolenic. The fixed oils obtained by conventional extraction methods have a slightly bitter taste, which is partly inherent in the constituents thereof and largely a result of hydrolysis of the lipids and rancidity thereof. However, fresh Fenugreek seeds are substantially free of bitterness. Any bitterness that is present is generally the result of hydrolytic breakdown of the lipids, which generally does not occur in the present process.

Dietary Fiber:

The term dietary fiber refers to soluble and insoluble fiber and covers hemicellulose, cellulose, mucilage, lignin and, optionally resistant starch and other materials. The dietary fiber therefore, contains in a concentrated form of the soluble and insoluble fiber, proteins and vitamins and minerals of fenugreek seed and is a good base for preparations of food supplements and additives. In relation to this invention, dietary fiber is defined to be the residue left after the extraction of oleoresin and fixed oils. Thus the fenugreek dietary fiber of the invention comprises substantially all of the insolubles originally contained in the seed. As regards the soluble fiber, a small part of it contained in the seed is extracted out by the alcohol solvent used for extraction in the second stage of the process of the invention. The extracted out soluble fiber is a small part of the mucilage (gum) of the seed. Substantially all of the proteins also remain in the residue fibre and so also the vitamins and minerals. The residue also contains any other unextracted or partly-extracted constituent of the seed.

Dietary fiber contains the non-absorbable, indigestible fibrous portion of the food. It is not assimilated by the body and is non-caloric and has substantially no nutrition value. Insoluble dietary fiber mainly comprises cellulose, lignins and some hemicelluloses; while, soluble dietary fiber mainly comprises pectin, gums and some hemicelluloses. The actual benefit provided by soluble fiber depends upon its content, the source from which it was isolate and the process by which it was isolated. Advantageously, the dietary fiber produced by the present invention has a fiber content in the range of about 48%–60% by wt. or an average of about 52% by wt. It also has a favorable soluble to insoluble fiber ratio that approximates 1 or is about 0.9:1 to about 1:0.9.

The dietary fiber obtained by the process of the present invention is advantageous over dietary fiber obtained by conventional processes. The dietary fiber made according to the process of the invention generally comprises the following components in the amounts indicated:

| COMPONENT | AMOUNT (% w/w) One Embodiment | AMOUNT (% w/w) General Embodiments |
| --- | --- | --- |
| Moisture | 4.35% | 4–6% |
| Protein | 41.02% | 35–42% |
| Fat | <0.1% | <0.5% to <0.1% |
| Fibrous material | 52.5% | 48–60% |

The fenugreek dietary fiber was observed by these inventors to be suitable for edible purposes. It is primarily rich in both soluble and insoluble fiber and its effectiveness has been established in tests. It is also rich in proteins and well provided with several vitamins and minerals. It is approximately light yellowish brown with little to no taste or odor and therefore forms an excellent substrate for taste, color and flavoring agents and can be easily blended. As compared to fiber produced by conventional processes, the dietary fiber of the invention includes higher levels of minerals, nicotinic acid and vitamins, such as riboflavin, Vitamin C. However, the dietary fiber may be fortified with further nutrients such as proteins, vitamins, minerals and others nutrients to form a Fenugreek dietary fiber based product.

Dietary fiber is an important and essential dietary element required to ensure normal functioning of the body and its internal processes such as digestion, food intake regulation, feeling of satiety, the glucose, insulin and cholesterol metabolism and others and in the prevention of several disorders. The dietary fiber can, either alone or in combination with other components, serve as a daily supplement and/or additive.

Proteins:

Fenugreek seeds are a rich source of protein, the overall content being about 26% in raw seeds, which gets concentrated to about 43% in the residual dietary fiber obtained upon extraction of the seeds. All the amino acids are represented in fenugreek seeds and the distribution and content thereof is almost equal to that of the other proteinous leguminous seed, soyabean. The limiting amino acid is tryptophan and the overall nutritive value of the seed protein as assessed by the WHO/FAO (1965) pattern is about 65. The seed is somewhat deficient in sulfur-containing amino acids and its most notable feature is the high lysine content. Substantially, the entire protein content of the raw seed passes into the residue fiber upon extraction.

Vitamins and Minerals:

Fenugreek seed contains vitamins A and C, thiamine, riboflavin, nicotinic acid and choline. The minerals present in the seed include sodium, potassium, iron, phosphorus and calcium. Substantially all of these constituents pass into the dietary fiber made according to the process of the invention making the dietary fiber a combination of an excellent food supplement.

Saponins and Sapogenin:

The saponins present in fenugreek are steroidal saponins which upon hydrolysis yield steroidal sapogenins: diosgenin and gitogenin. The saponin content of fenugreek seeds is about 4.8%. Saponins are known to affect the cholesterol metabolism favorably and make a useful additive to the dietary fiber. Resins and glycosides are extracted out by the second solvent alcohol.

In this specification, the term "extraction" refers, depending on the context, to either the unit operation of extraction wherein a liquid solvent is brought into contact with a solid material with the object of dissolving (leaching out) one or more components thereof, or a process having the extraction operation as one of the steps thereof. During liquid-solid extraction, an extraction solvent is brought into contact with a solid material that contains a solute to be extracted therefrom. During the extraction, the solute is dissolved in the extraction solvent. The concentration of the solute in the solvent increases as the extraction proceeds till the solvent is saturated with the solute or all of the solute contained in the solid material is extracted out, whichever comes first.

In this specification, a solvent comprising the solute in solution is referred to as the "solution" or as the "extract" and the solid material after extraction is referred to as the "extracted solids" or "extracted mass". Sometimes, the "solution" is also referred to merely as the "solvent" particularly where the solute content therein is fairly small. In case of there being two stages of extraction, the terms used are "first extraction solvent" or "first solvent", "first solid material", "first extract" and "first extracted solids" etc., for the first stage and similarly for the second stage. Where a particular fraction of a spice such as fixed oils or oleoresin is being extracted, the selected solvent would dissolve several, or even all of the individual components (compounds) which constitute the respective fraction. References to a solute hereinbelow, generally refers to the component(s) that is (are) extractable by the respective extraction solvent.

The extraction parameters that affect the degree and rate of extraction include: 1) the contact ratio, which is the ratio of the amounts of solvent and solids contacted; 2) the extraction temperature, which is the temperature at which the contacted mass of solvent and solids is maintained during extraction; 3) the extraction or contact time, which is the period during which the solvent and solid are contacted; 4) rate of removal of the extract from the extracted mass; 5) the particle size of the solids being treated by extraction; and 6) the solvent concentration.

The raw material for the process of the invention is fenugreek seeds. The seeds may be virgin, i.e., unextracted, or partly extracted, having undergone one or more previous extractions for the fractions, oleoresins, fixed oils, essential oil, dietary fiber or any of the other compounds that are constituents of the Fenugreek seeds. The seeds may be given any preliminary treatment before extraction as necessary. For example, the seeds may be sorted, graded and cleaned. The seeds may be dried to a moisture content as desired, prior to size reduction or extraction. The seeds may then undergo a size reduction operation comprising crushing, grinding, flaking, milling and/or screening as required.

The process of the invention is simply and easily adapted for any feed size of the seeds from whole seeds to milled flour. The seeds are generally crushed or ground before extraction so as to provide increased surface area for contact with solvent. Better contact between the solvent and solid results in a greater rate of extractions and reduces the contact time. The size of the crushed seeds charged to the extractor is generally −60 to +90 BSS (British Standard Sieve).

The seeds are then fed to the first stage extractor system and after first extraction are fed to the second stage extraction system, if a second one is used. Otherwise, the seeds are kept in the first stage extraction system, and the extraction solvent is changed. Alternatively, the seeds can be removed and dried after the first extraction and stored for later use in the second extraction. Further size reduction may be done before conducting the second extraction; however, a second size reduction is generally not required.

There are a large number of solvents (or mixtures thereof) that may be used as extraction solvents. The extraction solvent for the first stage is generally petroleum ether, hexane, n-propanol, or isopropanol or mixtures thereof and, for the second stage, is generally ethanol, isopropanol, aqueous ethanol or mixtures thereof. In one embodiment, the solvent for the first stage is petroleum ether (40–60) and for the second stage is 90–95% aqueous ethanol. Any aqueous ethanol of 90% and above, or preferably, 90–95% strength may be used. A solvent mixture can comprise any two or more different solvents. The second stage solvent ethanol generally extracts out the saponin content along with the oleoresin and fixed oils.

An extraction may be carried out at substantially the boiling point of the solvent. Generally, the extraction is carried out at any temperature from above ambient to substantially the boiling point of the solvent. The extraction can also be carried out at substantially the condensing temperature (the temperature at which the solvent condenses in the condenser of the apparatus) of the solvent but extractions at other temperatures are within the scope of the invention. Extraction at the highest feasible temperature, offers a high leaching rate and consequently a low contact time. In specific embodiments, the operating temperatures are 50° C. to 60° C. in the first stage and 78° C. to 82° C. in the second, when the solvents are petroleum ether and aqueous ethanol, respectively.

Petroleum ether is low boiling and easy to remove from the first extract. The second solvent, such as ethanol, is also easy to remove by direct evaporation thereof or by other means. Traces of the second solvent, aqueous ethanol in the second extract even if remaining, do not pose any health hazard nor do they in any way distort the characteristics of the product. Generally, in the process of the invention, solvent traces are substantially completely eliminated, meaning that there may be very small traces of solvent remaining, but that the amounts are generally less than 20 ppm.

The contact ratio, that is, the ratio of the weight of the material to be extracted (kg) to the total volume (L) of solvent contacted therewith in either extraction stage generally ranges from 1:1 to about 1:10 and even higher. A higher value coupled with a faster boiling rate in the reboiler has the effect of bringing down contact time. A higher contact ratio also means higher energy costs of boiling of the solvent. The contact ratios in one embodiment generally range from 1:1 to 1:5 for the first stage extraction and 1:1 to 1:7 for the second stage extraction.

The dietary fiber can be dried in any conventional dryers available in the art such as tray, vat, rotary, fluidized bed type or others. The dryer can have steam, electrical or other heating means to accelerate solvent removal. In one embodiment, the drying is conducted for about one hour to evaporate the solvent adhering to the solids and to reduce the moisture content to about 3%–5%, The dried fiber is then cooled to ambient temperature.

The solvent is generally removed from the first and second extracts by heating. Heating in the invention is generally conducted in the reboilers of the extraction systems; however, many other methods of solvent removal are available in the art such as removal under vacuum with or without heating and others. These methods are easily adapted to the process of the invention and all such modified methods are within the scope of the invention.

The solvents from the first and second extracts are generally removed by evaporation in the reboiler or in their respective reboilers if two extractors have been used, one for each stage. Other methods of desolventising, i.e., of solvent removal and recovery, may be used and are considered within the scope of the invention.

When solvent is evaporated from the first extract, it yields substantially pure fixed oils product which may then be sent for further operations as required, such as analysis, testing, packing and the like.

The second extract generally comprises fixed oils, substantially all of the oleoresin in the seeds, 90–95% ethanol (the second extraction solvent), and optionally, solids, fat and wax impurities. The second extract is generally also heated in the reboiler to evaporate off substantially all of the solvent. The solvent-free second extract is then heated in a stirred jacketed vessel to about 110° C. so as to remove solvent traces and moisture yielding a mixture comprising substantially pure oleoresin and fixed oils.

In one embodiment, a jacketed vessel having provision for both heating (by steam) and cooling (by cooling water) is employed. The jacketed vessel further has optional paddle and propeller type agitators, the former for scraping away oleoresins if any, sticking to the vessel surface and the latter to provide mixing action. After evaporation of the solvent traces the product mixture is cooled to about 40° C. to 50° C. by circulating cooling water in the jacket. After cooling, the mixture is treated with 98% ethanol and the material maintained at about 50° C. This is carried out, in one embodiment, in a jacketed agitated vessel; although other equipment known to those of ordinary skill in the chemical processing art may be used.

The product mixture extract obtained after treatment with 98% ethanol is cooled to about −10° C. to −15° C. In one embodiment, the cooling is done in a jacketed agitated vessel cooled with chilled brine. At this point, the product mixture extract separates out into a heavy phase comprising substantially pure oleoresin, a light phase comprising substantially pure fixed oils along with the ethanol, and a small quantity of precipitated solids, fat and waxy matter.

The heavy and light phases are separated by any of the known means such as filtration, decanting, siphoning or others known to those of ordinary skill. The separated heavy phase generally comprises substantially pure oleoresin product.

The light phase is also subjected to separation by any of the known means to remove the remaining solid, fat and/or wax matter, if any. The ethanol is then evaporated off to yield the substantially pure fixed oil product. The process of the invention therefore optionally yields two batches of the substantially pure fixed oil product, one from the first extraction and one from the second extraction.

Referring to FIG. 1, the extraction system (1) comprises a vessel of stainless steel or other materials and is generally of circular cross section; however, other shapes or cross sections may be employed. The holding means (8) for the bed of seed material (11) may include a perforated plate (12) of suitably sized perforations with or without a filtering medium of cloth and/or other materials. In one embodiment, the holding means comprises a wire mesh stainless steel basket, a perforated plate, a wire mesh plate or a filtration medium.

The reboiler (4) comprises a generally cylindrical vessel (6) provided with steam coils (5), but other types of reboilers are within the scope of the invention. In one embodiment, the final traces of solvent is removed from extracts/fractions by evaporation in other equipment such as a steam heated jacketed agitated vessel. Other known equipment and other known desolventizing methods are within the scope of the invention. The reboiler (4) also comprises optional agitation means (7).

A major portion of the extraction solvent is removed from the extract to form a substantially pure fixed oil.

The extraction system also comprises a condenser, which is optionally of a tubular construction (coil(s) or shell and tube), (3) for circulation of coolant, such as water, therethrough. The condenser is located above the extraction vessel (holding means) so as to provide the shortest possible path for the freshly condensed solvent to the solid bed. Distributor means (19) are optionally provided for uniform distribution of the solvent over the upper surface of the seed material in the holding means. In one embodiment, the condenser body is made of carbon steel and the tube bundle is made of stainless steel.

Inter-connected piping (feedback or return loop) (13) is provided for conducting vaporized solvent (18) from the reboiler to the condenser. Once condensed therein, the solvent drips onto the seed (11) in the holding means (8). When the solvent reaches a predetermined level in the holding means, it is drained back into the reboiler. The drain line (14) is provided with a sampling outlet wherefrom samples of the extract(s) are periodically withdrawn for the indication of the concentration of the solute extract, i.e., a measure of the progress of extraction.

The heat input to the reboiler determines the rate of evaporation of the solvent and therefore, the rate of charging of the freshly condensed solvent to the extraction vessel. The freshly condensed solvent collects in the seed bed, and when the level of the solvent reaches the predetermined level, the collected solvent (along with the dissolved solute) is drained into the reboiler. The time from one draining to the next is referred to as the cycle time. A low cycle time implies a high throughput of the solvent and a high load of heat input whereas a high cycle time means that the solvent remains in contact with the bed somewhat longer during which the driving force continues to drop. Considering the factors, this invention provides that preferably the cycle times are from 20 minutes to 30 minutes. Approximately 5 minutes of a cycle time represents the draining time and the rest, the time during which the solvent collects in the bed.

Figure 2:
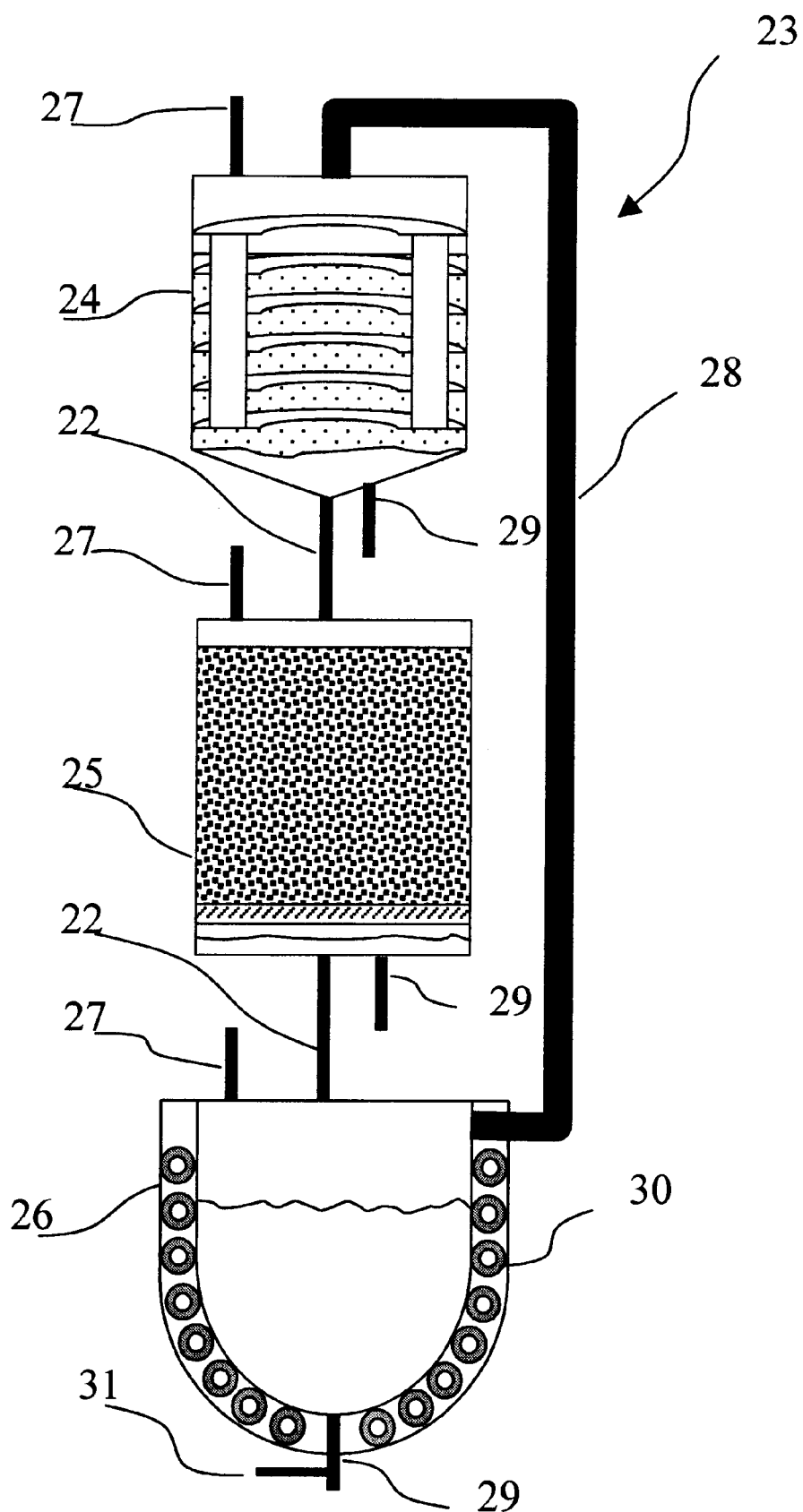
FIG. 2 is a sectional front elevation of an integrated extraction system used in conducting the process of the invention.

Referring to FIG. 2, the equipment used to conduct the extraction can be an integrated extraction system comprising two or three separate components that are connected to each other by way of conduits. The integrated system (23) comprises a condenser (24), holding means (25), reboiler (26), conduits or piping (22), a return loop (28), one or more vents (27), and one or more drains (29). In this system, the individual modules are separate but form a single integrated system whereby the modules are connected by conduits. Alternatively, the individual modules need not be connected by conduits and may be provided separately in proximate or spaced-apart locations. One or more of the individual components can also include a sampling line (31), which, for example, can be attached to the drain(s) or vessel. As depicted, the integrated system (23) includes no agitator in the reboiler or any jacket surrounding the extraction vessel. Instead, the reboiler includes steam coils (30) within its walls.

While one embodiment of the invention provides a semi-continuous process wherein the extraction vessel retains the extraction solvent for a period of time until the extraction solvent reaches a predetermined level, another embodiment of the invention requires that the extraction vessel function as a flow-through system such that the freshly condensed hot extraction solvent percolates (trickles or flows) through the seeds continuously without being retained in the extraction vessel for any significant length of time.

According to still another embodiment of the invention, the extraction solvent continuously contacts an upper portion of the solids and semi-continuously contacts a lower portion of the solids. Such a process occurs when the extraction solvent is evacuated from the evacuation vessel prior to the extraction solvent level reaching the upper portion of the solids in the extraction vessel.

In one embodiment, two extraction systems are used to perform the extraction of fixed oils and oleoresin from the seed. In this embodiment, the system of the invention comprises a first system (1) for conducting the first extraction and a second system (20, in phantom in FIG. 1) for conducting the second extraction. The first and second systems can be different in order to optimize performance with their respective solvents. Other arrangements such as one system serving two stages or more than one system serving a stage are within the scope of the invention. In the two-system embodiment, partially extracted seed is removed from the first system (1) and placed in the second system (20). The partially extracted seed may be dried and/or stored for later use prior to placement into the second system. Accordingly, specific embodiments of the invention provide processes for the sequential or concurrent extraction of fixed oil and oleoresin from Fenugreek seeds.

Any method of transferring the partially extracted material from and to the systems is within the scope of the invention. Preferably, however pneumatic conveying is employed in the embodiments described. Thus in one embodiment, handling of the solid matter is entirely by pneumatic means which helps in preventing ingress of impurities and foreign matter into the food grade products of the process.

As used herein, the term "substantially" means to a great extent, a major portion, approximately, about or for the most part. A substantially pure oleoresin comprises at least about 98% of oleoresin and no more than about 2% of other components. A substantially pure fixed oil comprises at least about 98% of fixed oil and no more than about 2% of other components. A substantially pure dietary fiber comprises at least about 48% of dietary fiber and no more than about 0.3% of fat content.

In the above detailed description of the invention several alternatives of process parameters, processing procedures, equipment and other factors have been considered. Many more such alternatives can be formulated simply and easily by persons skilled in the art. The alternatives constitute embodiments of the present invention and are within the scope thereof.

As used herein, the term "substantially" is generally taken to mean "for the most part."

In order to provide a clear understanding of this invention, two embodiments thereof will now be described in detail by way of example, and without limitation to the scope of the invention. The following examples should not be considered exhaustive, but merely illustrative of only a few of the many embodiments included within the scope of the present invention. The methods described herein can be followed to fixed oils, oleoresin and/or dietary fiber according to the invention.

EXAMPLE 1

About 2 kg of healthy Fenugreek seeds were taken and cleaned to remove all extraneous matter such as dirt or waste. The seeds were then ground to −60 to +90 BSS. The ground seeds were charged to the extractor of the first stage into a stainless steel wire basket of a first extraction vessel. Petroleum ether was loaded into the reboiler. The vapor line from the reboiler has regulating means so as to direct the vapor to either the extraction vessel or outside, i.e., to condensation and storage. The valves were adjusted to charge the vapor into the condenser, from where after condensation the condensed solvent entered the extractor and percolated into the seed bed. The solvent began to collect in the bed. A cycle time of 25 minutes was used of which about 20 minutes was the time during which the solvent collected in the bed and submerged the bed. When the solvent reached a predetermined level which was fixed at a height, a few centimeters above the top of the bed the drain valve opened automatically and the solvent containing solute drained back into the reboiler. The draining time was about 5 minutes. Six cycles of extraction were carried out so that the total time of extraction (contact time) was about 1.5 hours. The extraction was carried out at a temperature of about 50° C. to 55° C.

The contact ratio over the whole extraction phase was about 1:2.5 to 1:3.5 weight/volume (kg/L). The seed material from the seed bed of the first stage, namely the partly extracted seeds, was removed and dried to remove residual solvent and then charged to the second stage extraction module. The solvent was evaporated from the first extract and about 0.13 kg of the substantially pure fixed oil product was obtained.

About 1 kg of the dried seed material obtained after the first stage extraction was loaded into the second stage extraction module where the extraction solvent was 92–95% ethanol. The same cycle time was used but seven cycles were carried out, the overall contact time being about three hours. The extraction was carried out at a temperature of 78° C. to 82° C. The contact ratio was about 1:2.5 to 1:3.5 weight/volume (kg/L).

The substantially pure dietary fiber obtained from the second stage was dried to remove solvent traces and to bring down the moisture content to below 5%. The dietary fiber contained the following components in approximately the amounts indicated.

| Moisture | 4.35% w/w |
| Protein | 41.02% w/w |
| Fat | <0.1% w/w |
| Fibrous material | 52.5% w/w |

The product obtained was of a very high purity and met all the requirements of a food grade product and more. The dietary fiber had an extremely low fat content.

Solvent from the second extract was evaporated off in the second stage reboiler to yield a product mixture consisting of substantially all of the oleoresin in the seeds; substantially all of the fixed oils remaining in the seeds after the first stage extraction; fat and waxes impurities if any; residual solvent; and moisture.

This product mixture was heated in a jacketed agitated vessel to about 110° C. to evaporate the residual solvent. Thereafter the mixture was cooled to about 40° C. About 175 ml of 95–98% ethanol was added, and the mixture was stirred for about one hour during which the temperature was maintained at about 50° C. The treated product mixture was cooled to about −10° C. to −15° C. by keeping it in an ice salt bath. The treated mixture separated into a light and a heavy phase. The heavy phase was decanted and comprised the oleoresin fraction, which was substantially pure oleoresin. The impurities were filtered out of the light phase from which solvent was evaporated off to obtain a second batch of the substantially pure fixed oils.

EXAMPLE 2

About 2 kg of ground fenugreek seeds were extracted in the first stage with hexane. The contact ratio was about 1:3 W/V, and the extraction was carried out at from 64° C. to 68° C. The cycle time was about 25 minutes, and the extraction was done for about 2–5 hours. After the first extraction stage was completed, the seed material was removed from the extraction vessel and dried to remove solvent. It was then charged to second stage extraction vessel. Solvent was separated from the first extract by simple distillation and 0.14 kg of fixed oil product was obtained.

The rest of the extraction procedure was carried out as in Example 1 to provide substantially pure oleoresin and dietary fiber.

The above is a detailed description of particular embodiments of the invention. It is recognized that departures from the disclosed embodiments may be made within the scope of the invention and that obvious modifications will occur to a person skilled in the art. Those of skill in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

We claim:

1. A method of obtaining valuable components from Fenugreek seeds comprising the steps of:
   extracting the Fenugreek seeds with a hot first extraction solvent to provide a first useful extract and a first extracted mass, wherein the first useful extract comprises fixed oils;
   extracting the first extracted mass with a hot different second extraction solvent to provide a second useful extract and a second extracted mass, wherein the second useful extract comprises oleoresin; and
   removing solvent from the second extracted mass to provide a useful solid; wherein
   the first extraction solvent is selected from the group consisting of petroleum ether, hexane, n-propanol, isopropanol, and a combination thereof; and
   the second extraction solvent is selected from the group consisting of ethanol, isopropanol, aqueous isopropanol, aqueous ethanol and a combination thereof; and
   the process further comprises the step of:
   removing a major portion of the first extraction solvent from the first useful extracts to form substantially pure fixed oil.

2. The method of claim 1 further comprising the step of: removing a major portion of the second extraction solvent from the second useful extract to form a first mixture comprising oleoresin and fixed oil.

3. The method of claim 2 further comprising the step of:
   treating the first mixture of oleoresin and fixed oil with an ethanolic solution to form a fluid comprising a first layer comprising a major portion of oleoresin and second layer comprising a second mixture of ethanol, fixed oil and optionally one or more other components; and
   separating the first layer from the second layer to produce a substantially pure oleoresin.

4. The method of claim 3 further comprising the step of:
   removing solids, if any, from the second mixture; and
   removing at least a major portion of the ethanol from the second mixture to form substantially pure fixed oil.

5. The method of claim 1, wherein the useful solid comprises a dietary fiber.

6. The method of claim 1 further comprising one or more of the following steps:
   cleaning the seeds;
   grinding the seeds;
   sorting the seeds;
   tempering the seeds;
   flaking the seeds;
   crushing the seeds; or
   milling the seeds.

7. The method of claim 1, wherein the first extraction solvent is petroleum ether having a boiling range of about 40–60° C. and the second extraction solvent is an ethanolic solution.

8. The method of claim 1, wherein the first and second solvents are hot and recently condensed prior to addition.

9. The method of claim 8, wherein the first extraction solvent is obtained from a reservoir containing the first useful extract and the second extraction solvent is obtained from a reservoir containing the second useful extract.

10. The method of claim 8, wherein the first and second extraction solvents are solute free.

11. The method of claim 1, wherein the first extraction step removes at least 85% of the fixed oils from the seeds.

12. A process for the extraction of fenugreek seeds to produce substantially pure dietary fiber, oleoresin and fixed oils comprising the steps of:
   (i) optionally sorting and cleaning the Fenugreek seeds and optionally crushing, grinding flaking and/or milling the seeds;
   (ii) extracting the seeds with a substantially freshly condensed first extraction solvent in a first stage of extraction to yield a first extract and partly extracted seeds;
   (iii) extracting the partly extracted seeds with substantially freshly condensed second extraction solvent in a second stage of extraction to yield a second extract and a wet dietary fiber;
   (iv) drying the wet dietary fiber to form a substantially pure dietary fiber;
   (v) heating the first extract to remove at least a major portion of the first extraction solvent therein to yield substantially pure fixed oils;
   (vi) heating the second extract to remove at least a major portion of the second extraction solvent to yield a first mixture comprising oleoresin and substantially the remainder of the fixed oils in the seeds;
   (vii) treating the first mixture with an ethanolic solution for a period of time and at a predetermined temperature to form a treated mixture;
   (viii) cooling the treated mixture to a lower temperature to yield a fluid comprising at least a heavy phase and a light phase;
   (ix) separating the heavy phase from the light phase, to form a substantially pure oleoresin;
   (x) separating any solids from the light phase; and
   (xi) evaporating the ethanolic solution from the light phase to yield substantially pure fixed oils; wherein
   the first solvent is selected from the group consisting of petroleum ether, hexane, n-propanol and isopropanol and mixtures thereof; and the second solvent is selected from the group consisting of ethanol, isopropanol, aqueous isopropanol, aqueous ethanol and mixtures thereof.

13. The process of claim 12, wherein the seeds are substantially continuously extracted with substantially freshly condensed solvent over substantially the whole the contact time.

14. The process of claim 12, wherein the first solvent is petroleum ether having a boiling range of about 40–60° C., and the second solvent is at least 90% aqueous ethanol.

15. The process of claim 14, wherein the first extraction is conducted at a temperature of 50° C. to 60 ° C. and the second extraction is conducted at a temperature of 78° C. to 82° C.

16. The process of claim 12, wherein the seed is sized to −60 to +90 BSS.

17. The process of claim 12, wherein the ratio of the amount of the seed to the amount of first extraction solvent is 1:1 to 1:5 weight/volume (kg/L), and the ratio of the amount of the seed to the amount of second extraction solvent is 1:1 to 1:7 weight/volume (kg/L).

18. The process of claim 17, wherein the overall contact time in the first extraction is about 1 to 2.5 hours and in the second extraction is about 2 to 4 hours.

19. The process of claim 18, wherein the cycle times in the first and second extractions range from 15 minutes to 35 minutes.

20. The process of claim 12, wherein the first mixture is treated with at least 95% ethanol for a period of time about 45 minutes to 90 minutes at a temperature of about 45° C. to 55° C.

21. The process of claim 20, wherein the ratio of amount of the first mixture to the at least 95% ethanol is about 1:1 to 1:3.

22. The process of claim 12, wherein the treated mixture is cooled to about −10° C. to −15° C.

* * * * *